(12) United States Patent
Bindana et al.

(10) Patent No.: US 11,800,039 B2
(45) Date of Patent: Oct. 24, 2023

(54) METHODS AND SYSTEMS FOR PROTECTING SCANNED DOCUMENTS

(71) Applicant: XEROX CORPORATION, Norwalk, CT (US)

(72) Inventors: Srinivasarao Bindana, Kakinada (IN); Ashok Jason Vedaraj, Chennai (IN); Shalini Kondore, Secunderabad (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/554,422

(22) Filed: Dec. 17, 2021

(65) Prior Publication Data

US 2023/0199132 A1 Jun. 22, 2023

(51) Int. Cl.
*H04N 1/44* (2006.01)
*H04N 1/00* (2006.01)
*H04N 1/32* (2006.01)

(52) U.S. Cl.
CPC ......... *H04N 1/444* (2013.01); *H04N 1/00135* (2013.01); *H04N 1/32144* (2013.01); *H04N 1/32149* (2013.01); *H04N 1/4406* (2013.01); *H04N 1/4413* (2013.01); *H04N 1/00854* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 8,717,593 | B2* | 5/2014 | Kakegawa | G06F 21/554 358/1.14 |
| 10,248,798 | B1* | 4/2019 | Jayakumar | G06F 21/608 |
| 10,896,262 | B2* | 1/2021 | Kamiya | G06F 21/608 |
| 2003/0149881 | A1* | 8/2003 | Patel | H04L 9/3231 713/186 |
| 2009/0147292 | A1* | 6/2009 | Shimura | H04N 1/00854 358/1.14 |
| 2015/0248560 | A1* | 9/2015 | Pathak | G06F 21/00 726/26 |
| 2016/0294832 | A1* | 10/2016 | Pathak | G06F 21/10 |
| 2018/0367699 | A1* | 12/2018 | Sato | H04N 1/444 |
| 2020/0228679 | A1* | 7/2020 | Packirisamy | H04N 1/4413 |

* cited by examiner

*Primary Examiner* — Miya J Cato
(74) *Attorney, Agent, or Firm* — Jones Robb, PLLC

(57) ABSTRACT

The disclosure discloses methods and systems for securing documents submitted for scanning at a device such as a multi-function device. The method includes scanning a document received from a user. A user interface is provided to the user to define a document type and to further define an access level for accessing the scanned document. Then, scanned data is generated. The scanned data is encoded based on a unique identity of the device and based on the access level such that the scanned data is accessible by the user and/or by one or more other users according to the defined access level. Finally, the scanned document is generated. Later when the scanned document is accessed by any user, details of the user accessing the scanned document is matched with details added in the encoded scanned data. Based on matching, the user is allowed to access the scanned document.

14 Claims, 10 Drawing Sheets

METHODS AND SYSTEMS FOR PROTECTING SCANNED DOCUMENTS

TECHNICAL FIELD

The present disclosure relates to the field of scanning, more specifically, relates to methods and systems for protecting scanned documents.

BACKGROUND

Existing multi-function devices or scanners offer password protected scan feature. Each time when a user wants to secure his documents, he uses password protected scan feature. As an example, the user first sets a password of his choice at the multi-function device at the time of scanning or after scanning and later uses the same password to access the scanned document at any device such as computing device, laptop, phone, or the like. If the user wants to share the scanned document with other users, he or she requires sharing his password with other users for them to access the scanned document. In this approach, there is no assurance that the scanned document of the user remains protected. Because there are chances that any user who has the password can further share the password with other users intentionally or unintentionally. This unnecessary creates problems for the user. In other cases, passwords can be hacked. As a result, this can be a huge data loss or damage for the user and/or for organization. In highly secure environments/organizations such as Defense, Research & Development Institute, Banking Service, Medical Department, DRDO, Government Organization etc. the data/information is more sensitive/confidential, and thus, it becomes important to secure the data. Implementing the password protected scan feature in such highly secure environment may not be very helpful as there is a possibility of confidential data to be leaked out (via hacking/password sharing). Thus, there is need for improvised full-proof methods and systems to provide secure scanning such that scanned documents, or its content remain within the office premise or can only be accessed by authorized teams/users.

SUMMARY

According to aspects illustrated herein, there is a method for securing documents submitted for scanning at a device such as a multi-function device, or a mobile device. The method includes scanning a document. A user interface is provided to a user to define a document type and to further define an access level for accessing the scanned document. Then, scanning is initiated to generate scanned data. The scanned data is encoded based on a unique identity of the device and based on the access level such that the scanned data is accessible by the user and/or by one or more other users according to the defined access level. Finally, the scanned document including the encoded scanned data is output.

According to further aspects illustrated herein, a method for accessing a protected scanned document at a device, is disclosed. The method includes receiving a request to access the protected scanned document, wherein the protected scanned document is an encoded scanned document. Before providing access to the content of the encoded scanned document, it is checked whether details added in the protected scanned document matches with details of a user accessing the scanned document. Based on the match, the user is allowed to access the content of the scanned document.

According to furthermore aspects illustrated herein, a multi-function device for securing documents submitted for scanning is disclosed. The multi-function device includes: a scanner for scanning a document; a user interface provided to a user to define a document type and to further define an access level for accessing the scanned document; and a controller for: generating scanned data; encoding the scanned data based on a unique identity of the multi-function device and based on the access level such that the scanned data is accessible by the user and/or by one or more other users according to the defined access level; and generating the scanned document including the encoded scanned data.

According to additional aspects illustrated herein, a system for securing documents submitted for scanning is disclosed. The system includes a multi-function device communicatively coupled to a computing device. The multi-function device is for: scanning a document; providing a user interface to a user to define a document type and to further define an access level for accessing the scanned document; generating scanned data; and encoding the scanned data based on a unique identity of the multi-function device and based on the defined access level such that the scanned data is accessible by the user and/or by one or more other users according to the defined access level. The computing device is for: receiving a request to access the secure scanned document; checking whether details added in the secure scanned document while encoding matches with details of a user accessing the secure scanned document; and based on the match, allowing the user to access the content of the secure scanned document.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 1A shows an exemplary environment in which various embodiments of the disclosure can be practiced, while

DESCRIPTION

Figure 1A:
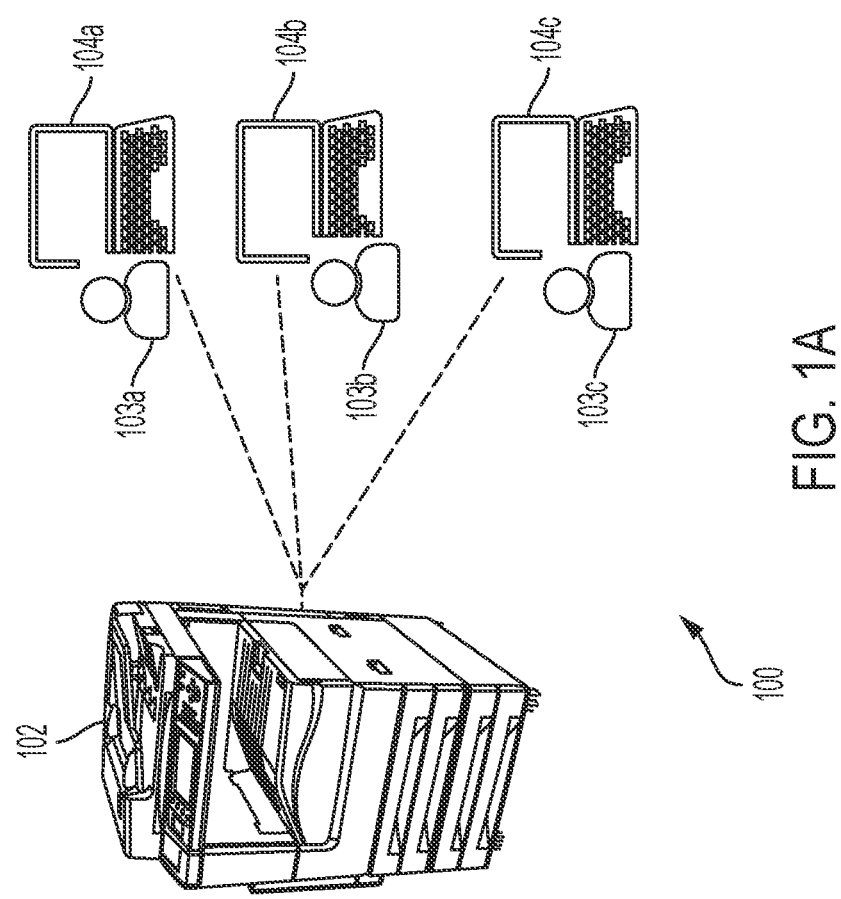

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or a combination thereof. In context of the current disclosure, the multi-function device includes a secure scanning feature. The secure scanning feature protects/secures a document while scanning or at the time of scanning such that content of the scanned document can be accessed by authorized users within the office premise i.e., either at the multi-function device that scans the document or at a networked multi-function device or computing devices. The scanned document is protected based on a unique identity of the multi-function device and based on an access level defined by the user who scans the document. In one example, the multi-function device secures the scanned document by encoding its content.

The term "unique identity" refers to a unique number assigned to the multi-function device. The unique identity can be IP address, MAC address, serial number or any other unique identity associated with the multi-function device.

The term "document" refers to any document related to a user and/or to an organization. The document can be in physical form, such as printed on paper. The document includes confidential data/content or sensitive information or otherwise confidential for the user and/or the organization. The document includes content may be in the form of text, image, graphics, or a combination thereof. The document may also be termed as a source document or as an input document. The document is provided as an input to the multi-function device for scanning. By default, the document submitted for scanning is protected by the multi-function device.

The term "scanned document" refers to an output obtained after scanning the document. The scanned document is in a virtual or software form (embodied in a software file). The virtual form can also be referred to as digital form, electronic version, or the like. The scanned document may also be termed as a scanned output file. In context of the present disclosure, the scanned document represents a protected/secure scanned document such that content of the scanned document can only be accessed by the user who scans the document within the office premise or can be accessed by other users who are pre-authorized by the user within the office premise. In both the cases, the secure scanned document can only be accessed by the user and/or by other users at the multi-function device or a networked multi-function device or using computing devices present in the office premise and/or are configured as per organization settings.

The term "user" refers to the one who scans the document at the multi-function device and the user who scans the document defines an access level for accessing the scanned document. The term "other users" refer to users who are given rights by the user to access content of the secure scanned document within the office premise. The "other users" may also be referred to as pre-authorized users based on the access level. The term "authorized users" refer to users who are allowed to access the content of the scanned document. For example, the authorized user can include the user who scans the document and/or the other users who are assigned access rights by the user who scans the document.

The term "protection" refers to encoding content of the scanned document using the unique identity of the multi-function device and is further encoded using details of one or more users. The one or more users may include the user who scans the document and may further include other users who are assigned rights to access the scanned document. The term "encoding" may cover encryption as one example for protecting the scanned data but other ways to protect the scanned data as known or later developed may also be implemented.

The term "access level" includes details of one or more other users for providing rights to access the scanned document and the type of access rights. The type of access level further includes read access and/or print access.

The term "generating scanned data" includes creation of scanned data wh ich may be raw scanned images obtained after scanning without implementing any image processing techniques. The term "generating scanned document" refers to creating scanned document/file which is obtained after performing necessary operations on the raw scanned images such as segmentation, binarization, alignment, brightness, or other known or later developed image processing techniques. In context of the current disclosure, one of the operations performed on the scanned data may include encoding the scanned data such that the scanned data is accessible according to the defined access level.

The term "profile of the user" refers to any details of the user that can identify the user. The profile details may be username, user ID, employee ID, phone number, email address, password, or the like. In the similar manner, "profile of the other users" refers to any details of the other users for identifying them. For example, the profile details may include username, user ID, employee ID, phone number, email address, password, or the like.

The term "computing device" refers to a device that a user typically uses for his day-to-day work such as to send emails, receive emails, view emails and other purposes. Examples of the computing device include, but are not limited to, a personal computer, a desktop, a laptop, a mobile phone, a tablet, a Personal Digital Assistant (PDA), a smart-phone or any other device capable of sending and/or receiving data. The computing device includes one or more applications such as print driver applications. In context of the current disclosure, the computing device refers to computing devices configured according to organization requirements and/or policies. The computing device refers to an office computing device.

The term "device" refers to any device with scanning or image capturing functionalities. The device can be a multi-function device, a scanner, or a mobile device. In context of the current disclosure, the device includes a secure scanning feature. The secure scanning feature protects/secures a document submitted for scanning such that content of the scanned document can be accessed according to the defined access level. For example, the scanned document can be accessed at the device, by the user who scans the document and/or by other users according to the access level defined by the user.

The present disclosure incorporates content related to securing content based on a unique identity of a multifunction device as disclosed in "MULTI-FUNCTION DEVICE AND METHOD FOR SECURE SCANNING" in the name of Xerox corp. This is just one example, but any other known or later developed methods/systems may be implemented to secure scanned document for the present disclosure.

Overview

The present disclosure discloses methods and systems for providing secure scanning feature. More specifically, the methods and systems secure a document submitted for scanning based on (i) a unique identity of a device such as a multi-function device, or a mobile device and (ii) an access level defined by a user who scans the document. The scanned document is secured such that the scanned document is accessed by the user and/or by one or more other pre-authorized users only at the multi-function device, a networked multi-function device or computing devices configured as per the organization policies and/or requirements. The methods and systems offer multiple layers of security by first encoding scanned data using the unique identity of the multi-function device and then encoding based on an access level defined by the user, thereby enhancing security of the scanned document. This way, the scanned document can only be accessed by the authorized user(s) within the organization and cannot be accessed or misused by any user within the organization premise or outside the organization.

The secure scanning feature includes securing the scanned document by encoding the scanned document using the unique identity and access level defined by the user. The secure scanned document can then only be printed/accessed at/to devices that match up with the unique identity and the access level defined by the user.

The methods and systems as disclosed may be implemented for high-security environments, where strict control of documents is required. For example, the present disclosure can be implemented for various domains/industries such as defense, research, medical, government, banking, or any other domains. These are just few examples, but the present disclosure can be implemented for any environments/organizations, where there is a need to secure documents submitted for scanning.

Exemplary Environment

FIG. 1A is an exemplary environment 100 in which various embodiments of the disclosure can be practiced. The environment 100 may represent an organization environment (office work environment), where one or more users work and perform their daily tasks as per the organization requirement. The environment 100 includes multiple office computing devices such as 104a, 104b, 104c (collectively 104) that are used by users 103a, 103b, and 103c (collectively 103) respectively for their tasks, and further includes various office devices such as a multi-function device 102, a scanner, a printer, and other office devices (although not shown). For the sake of discussion, FIG. 1A will be discussed with the multi-function device 102 as an example.

Figure 1B:
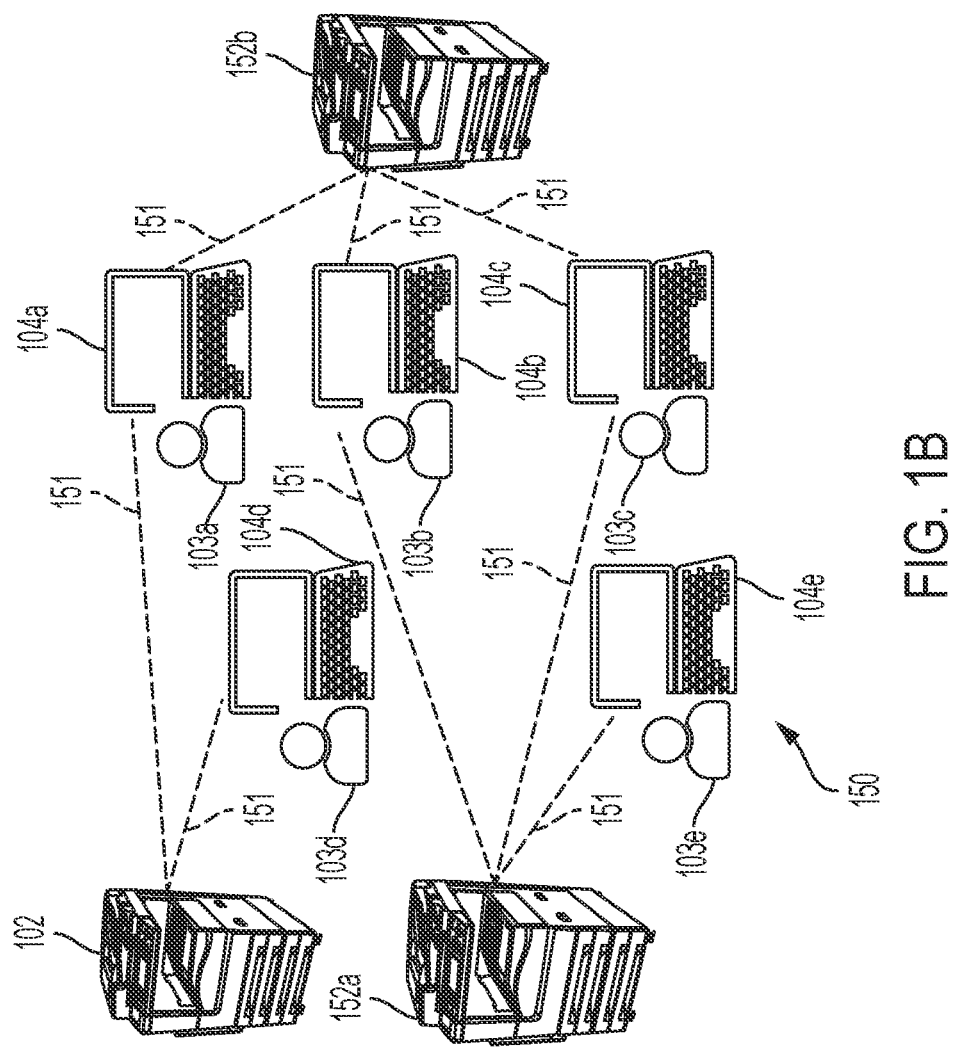
FIG. 1B shows another exemplary environment.

As shown, the multi-function device 102 is communicatively coupled to the one or more computing devices 104a, 104b, 104c, The multi-function device 102 provides one or more functionalities such as printing, scanning, copying, faxing, or a combination thereof. A user 103a uses the multi-function device 102 for his day-to-day activities related to printing, scanning, copying and so on. The multi-function device 102 is a standalone device, but the multi-function device 102 may be a part of network communicatively coupled to other multi-function devices as shown in FIG. 1B. In place of the multi-function device 102, the environment 100 may include a scanner, a mobile device or any other device with scanning or image capturing functionalities and secure scanning functionality. The multi-function device 102 has a unique identity such as MAC address, IP address, serial number, or the like.

In context of the current disclosure, the multi-function device 102 includes a secure scanning feature. By default, the secure scanning feature is enabled at the multi-function device 102 such that all documents submitted for scanning at the multi-function device 102 are protected/secured with or without user's knowledge. In some cases, the user may enable the secure scanning feature at the time of scanning the document, if secure scanning feature is disabled at the multi-function device 102. Typically, the multi-function device 102 scans a document and generates a scanned document. The scanned document may be in any desired format, but not limited to, a Portable Document Format (PDF), a Tag Image File Format (TIFF) or other known formats or later developed formats.

In operation, the user 103a submits a document for scanning at the multi-function device 102. The multi-function device 102 protects or secures the document at the time of scanning or while scanning such that the scanned document can be accessed by the authorized/approved users at the multi-function device 102 and/or a networked multi-function device. The multi-function device 102 protects or secures the document while scanning or after scanning or before generating the scanned document. To this end, the multi-function device 102 encodes the scanned document based on a unique identity of the multi-function device 102 and based on an access level defined by the user 103a, This ensures that the confidential information remains within the organization premises as well as with the authorized users within the organization environment 100, The scanned document is secured such that the scanned document can only be accessed by authorized/pre-approved users and within the organization environment 100. For example, the scanned document can be accessed by the user 103a and other pre-authorized users such as 103b and 103c at the multi-function device i.e., at the multi-function device 102 using which the scanned document is secured. In another example, the scanned document can be accessed by the user 103a and other pre-authorized users such as 103b and 103c at a networked multi-function device, i.e., a multi-function device communicatively connected to the multi-function device 102 through the office network (although not shown in FIG. 1A). In further example, the scanned document can be accessed by the user 103a and other pre-authorized users such as 103b and 103c using respective computing devices such as 104a, 104b and 104c, respectively.

In cases, when an unintended user receives the secure scanned document and tries to access the secure scanned document using any device such as his mobile device or other computing devices outside or present in the organization environment 100, he is not able to access the secure scanned document. As a result, the scanned document is secured and thus cannot be used outside the device, other than multi-function device i.e., the multi-function device 102 and/or location or the environment 100.

In context of the current disclosure, the scanned document is secured based on an access level defined by the user 103a and based on a unique identity of the multi-function device 102. The scanned document may be secured by encoding the content of the scanned document and encoding is a completely internal process handled by the multi-function device 102 itself so that only particular multi-function device i.e., the multi-function device 102 or a networked Multi-function device is able to decode it.

FIG. 1B is another exemplary environment 150 in which various embodiments of the disclosure can be implemented. The environment 150 is shown to include one or more multi-function devices such as 102 (multi-function device as shown in FIG. 1A), 152a, 152b, (collectively 152) and so on. Each of the multi-function devices 102, 152 are communicatively coupled to one or more computing devices such as 104a, 104b), 104c, 104d, 104e, and so on. Each of the multi-function devices 102 and 152 are connected to each other and are further connected to an office network 151. A multi-function device connected to another multi-function device via the office network 151 is referred to as a networked multi-function device. For example, the multi-function devices such as 152a, and 152b are networked multi-function devices for the multi-function device 102.

The multi-function devices 102, 152a, 152b, (collectively 152) may be present at a single location. In other example, the multi-function devices 102, 152a, 152b, (collectively 152) may be distributed geographically. The multi-function devices 102, 152a, 152b, (collectively 152) can be connected in the same network or via different network. The multi-function devices 102, 152a, 152b, may be communicatively coupled to each other via a network such as communication network 151. The communication network 151 may be a wireless network, a wired network, or a combination thereof. The communication network 151 may be implemented as one of the different types of networks, such as intranet, Local Area Network (LAN), Wide Area Network (WAN), the Internet, and the like. The communication network 151 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. The communication network 151 may include a variety of network devices, including routers, bridges, servers, computing devices, storage devices, and the like.

In operation, the user such as 103a submits a document for scanning at any multi-function device such as mufti-function device 102. As discussed above, the multi-function device 102 scans the document and secures it by encoding the content of the scanned document based on an access level defined by the user 103a and based on a unique identity of the mufti-function device 102. Once the scanned document is protected, the multi-function device 102 sends the scanned document to a destination as selected by the user 103a such as USB, network location, cloud location, internal server location, email or so on. The scanned document can be read, viewed, or printed by the user and the other users based on the access level definition.

It can be considered that the user 103a sends the scanned document to himself and one or more other users such as user 103b. For this, the user inputs his email address and the email address of the user 103b.

For accessing the scanned document, the user 103a uses his computing device 104a. Before displaying the content of the scanned document, the computing device 104a first checks whether user profile information encoded in the scanned document matches with the user profile information configured in the computing device 104a of the user 103a. The user profile information may be employee ID. If the employee ID encoded in the scanned document matches with the employee ID of the user 103a, then the user 103a is allowed to access the content of the scanned document. For example, content of the scanned document is displayed to the user 103a. In the similar manner, if the user 103b accesses the scanned document at his computing device such as 104b, a verification is performed internally or at the back end by the computing device 104b to check the user profile information. If the profile information of the user 103b matches with the profile information as encoded in the scanned document, then the user 103b is allowed to access the content of the scanned document. For example, content of the scanned document is displayed to the user 103b. This way, the user 103a and user 103b are able to access the content of the scanned document such as read or view.

In similar manner, if the user 103c accesses the scanned document at his computing device such as 104c, a verification is performed at the back end by the computing device 104c to check the profile information. Based on the check, content of the scanned document is displayed to the user 103c. In this example, the computing device 104c checks the user profile information of the user 103c and identifies that employee ID of the user 103c is not encoded or present in the scanned document. Here, the verification is failed and hence, the user 103c is not allowed to access the content of the scanned document. As a result, no content is displayed to the user 103c, or blank page is displayed to the user 103c.

The multi-function device 102 maps the unique identity and access level definition to the scanned document.

In some cases, the user 103b submits a print command from his computing device 104b to a multi-function device such as the multi-function device 102. The multi-function device 102 receives the protected scanned document. Before printing content of the scanned document, the multi-function device 102 internally first decodes the content of the scanned document, checks the profile information of the user 103b. If the profile information of the user 103b matches with profile information encoded in the scanned document. The multi-function device 102 further checks access right provided to the user 103b. If the access rights assigned to the user 103b includes print rights, then the multi-function device 102 prints the content of the scanned document. Else, the multi-function device 102 shows an error to the user 103b. This way, the disclosure restricts access to the protected scanned document and keeps the content secure and safe.

In some cases, the user 103b submits a print command from his computing device 104b to a networked multi-function device such as the multi-function device 152a. The multi-function device 152a receives the protected scanned document. Before printing content of the scanned document, the multi-function device 152a internally first decodes the content of the scanned document and then checks the profile information of the user 103b. If the profile information of the user 103b matches with profile information encoded in the scanned document and further checks access right provided to the user 103b. The multi-function device 152a further checks the unique identity of the multi-function device 152a. The multi-function device 152a matches its unique identity/identification number with the unique identity (i.e., of the multi-function device 102) encoded in the scanned document. If matches, the multi-function device 152a prints the scanned document. Otherwise, the multi-function device 152a further checks whether the unique identification number of the multi-function device 152a belongs to an office network 151, the network 151 where the multi-function device 102 is present. The presence of the unique identity of the multi-function device 152a on the office network 151 indicates that the multi-function device 102 belongs to the network 151 and defines the office premise 150. Subsequently, the multi-function device 152a prints the content of the scanned document. Else, the multi-function device 152*a* shows an error to the user 103*b*. This way, the disclosure restricts access to the secure scanned document and keeps the content secure and safe.

The disclosure can be implemented in the form of a non-transitory computer-readable medium. The non-transitory computer-readable medium includes instructions executable by a processing resource to: scan a document received from a user; provide a user interface to the user to define a document type and to further define an access level for accessing the scanned document; generate scanned data; and encode the scanned data based on a unique identity of a device such as a multi-function device and based on the access level such that the scanned data is accessible by the user or by one or more other users according to the defined access level.

Exemplary System

Figure 2:
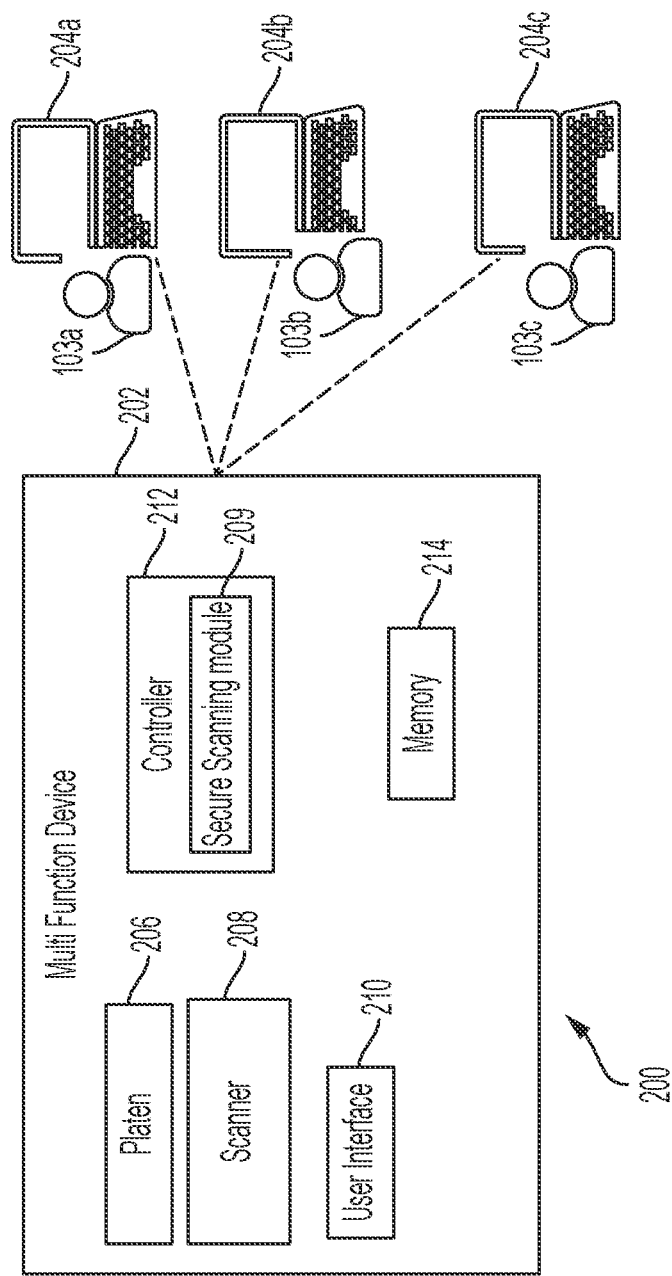
FIG. 2 represents an overall system for securing a scanned document.

FIG. 2 is an overall system 200 for protecting one or more documents submitting for scanning. The document can be protected while scanning, at the time of scanning or after a scanned document is generated. The document is protected such that only authorized users can access the content of the scanned document such as he can view the content, read the content, or print the content of the scanned document. The system 200 includes a multi-function device 202 communicatively coupled to one or more computing devices 204*a*, 204*b* or 204*c* (collectively 204). The multi-function device 202 includes a platen 206, a scanner 208, a user interface 210, a controller 212 including a secure scanning module 209, and a memory 214, where the computing devices 204 include a print driver application. Each of the components 206-214 are coupled to each other via a communication bus or later developed protocols and each of the components 206-214 communicate with each other for protecting/securing scanned documents. The multi-function device 202 may include one or more addition al components as required to implement the present disclosure. The secure scanning module 209 is shown as a part of the controller 212 but the secure scanning module 209 may be a separate component or unit of the multi-function device 202.

The system 200 is implemented by an organization to secure content of the scanned document such that only authorized users are allowed to access content of the scanned document within the office premise such as office computing devices 204, multi-function devices 202, scanners or any device configured as per organization requirements and further the authorized users are also not allowed to access content of the scanned document outside the office premise/environment or at outside devices such as home computing devices or printing devices. The system 200 is implemented such that no user other than the authorized users can access the content of the scanned document. This way, the system 200 restricts access control of documents as per the organization policies and/or requirements. The authorized users refer to Include users who are assigned access rights by the user who scans the document. The authorized users can access the content of the scanned document based on type of access rights defined by the user such as read/view, print or so on.

The scanner 208 may be an Automatic Document Feeder (ADF) or a flatbed scanner. The flatbed scanner includes a glass or a platen 206 for receiving the document. In such cases, the receiver may be a glass.

The memory 214 stores the scanned document for later retrieval and/or access such as displaying and/or printing. The stored scanned document can be accessed by the user later. The memory 214 further stores the unique identity associated with the multi-function device 202, details about other networked multi-function devices, profile details of the user, profile details of the other users, and other details relevant for implementing the present disclosure.

Secure Scanned Document

In operation, a user submits a document at the platen 204 for scanning. The document includes content which is confidential for the user and/or for the organization. The content may be in any form such as text, graphics, image, or a combination thereof. Once submitted, the user initiates scanning by pressing a scan button on the multi-function device 202 or a through the user interface 210 of the multi-function device 202. Post receiving the scan command from the user, the controller 212 provides the user interface 210 to the user for user's input. The user interface 210 is provided to the user to define a document type that the user wants to scan. The document type may be public, internal, external, confidential, confidential, and privileged, restricted, or so on. The user can define the document type by providing his inputs through the user interface 210. In one example, a drop menu option may be shown to the user through the user interface 210, and the user can select the document type through the drop menu option. In another example, multiple options may be shown to the user through the user interface 210 in the form of check boxes. The user can select any check box through the user interface 210. For example, if the document includes client related information, the user can select the document type as confidential. In another example, if the document includes generic information such sales process etc., the user can select document type as internal. In further example, if the document includes confidential information for specific users, the user can select the document type as restricted. In furthermore example, if the document includes internal processes such as organization policies, project timelines, project processes, the user can select the document type as internal. In additional example, if the document includes content that can be accessed by anyone, the user can select the document type as public. If the document includes content that is to be shared with users outside the organization, the user can select the document type as external.

Post receiving the inputs from the user on the document type, the user interface 210 further requests the user to define an access level for accessing the scanned document. The access level includes definition of who all can access the scanned document or content of the scanned document and/or type of access for those users. In other words, the access level includes details of one or more other users who to provide access to the scanned document. The access level can be defined based on the project type, team type, department type, specific user group, client type, or a combination thereof. The user can provide his inputs on the access level through the user interface 210. The rough the user interface 210, the user defines/provides profiles of the one or more other users for providing access to the scanned document. For example, the user can select an option project type, and further provides details of the one or more other users such as names, employee IDs, user IDs, email addresses, or the like. In case the user does not know the details of the one or more other users, the controller 212 identifies details of the one or more other users based on the user input.

The controller 212 identifies the user's input and then retrieves relevant profile information from the memory 214. For example, the relevant information may be usernames, user IDs, user email addresses, user phone numbers or so on. As an example, if the user selects the project type as an option, the user inputs project details for example project name "electric vehicle", people working on the project and so on. In another example, the controller 212 retrieves details of the project from the memory 214 such as users working on the project and corresponding user IDs. As another example, if the user selects team type as an option and team names, the controller 212 retrieves details of the user IDs. If the user selects department type, the user further inputs names of the department, the controller 212 further retrieves details of the department. Based on the input from the user, the controller 212 retrieves user details belonging to the input department, team, project etc. Along with this, the user defines the type of access level such as read or print access for the one or more other users through the user interface 210.

The controller 212 then passes the retrieved information and user profile details to the scanner 208 and other modules for further processing. The scanner 208 starts scanning the document as received from the user and generates the scanned data. The scanner 208 then passes the scanned data to the secure scanning module 209 for encoding. The secure scanning module 209 then encodes the scanned data using a unique identity of the multi-function device 202 which is known to the multi-function device 202. The secure scanning module 209 further encodes the scanned data based on the access level defined by the user. In one example, the secure scanning module 209 encodes the scanned data using the retrieved profile information of the other users. In one example, email address of the other users may be embedded with the scanned data. In another example, user IDs of the other users may be embedded with the scanned data. These are two examples, but any other unique details associated with the other users can be used for encoding. While embedding details of the other users, the secure scanning module 209 embeds/adds details of the user who submits the document for scanning. By default, the user who submits the document for scanning has read, view, or print access rights.

Once encoded, a final scanned document including the encoded scanned data is generated. The scanned document may be output in any desired form such as PDF, JPEG, PNG, or the like. This way, the scanner 208 or the controller 212 outputs the secure scanned document such that the user and/or users authorized by the user can access the content of the scanned document within the office premise.

The controller 212 further provides one or more options to the user to send the scanned document to one or more destinations. The options are shown to the user through the user interface 210. Various examples of the destinations may be a USB, the memory 214 of the multi-function device 202, a cloud location, a server location, email an address, any shared network or USB or external storage devices or the like. The user can select any destination and share the secure scanned document. The secure scanned document can be accessed by the user and/or by one or more other users.

For the sake of discussion, it can be considered that the user 103a (user A) sends the scanned document to one or more other users such as user 103b (user B). To this end, the user inputs email addresses of the one or more other users i.e., the user B.

Access Scanned Document

Later, the scanned document can be accessed by the user A and/or other users such as the user B based on access level defined by the user A. It can be considered that the user A uses office computing devices to access the scanned document.

Before providing access to the content of the scanned document, it is first checked whether the user 103a who is accessing the scanned document is authorized user or not. Here, the computing device 204a first decrypts the content of the scanned document, retrieves user profile information, and matches the retrieved profile information with the user profile information encoded/embedded in the scanned document. If matches, content of the scanned document is displayed to the user 103a.

The one or more other users use their respective computing devices to access the received secure scanned document. Here, the other user such as user 103b accesses the scanned document at his computing device such as 204b, the computing device 204b first checks the profile of the user 103b. The computing device 204b retrieves the email address or user ID of the user 103b based on configuration of the computing device 204b. The retrieved user profile details are matched with the user details encoded in the scanned document. The matching indicates that the user 103b is an authorized user who is allowed to access the scanned document. If the retrieved user profile matches with the user profile encoded with the scanned document, then the content of the scanned document is displayed to the user 103b. As a result, the user 103b can read, view the content of the scanned document.

In some cases, the user 103b may want to print the secure scanned document. The user 103b sends the secure scanned document to the multi-function device 202 using his computing device 204b, specifically, print driver application. While submitting, the user 103b submits one or more print attributes through the print driver application. The Multi-function device 202 then receives the secure scanned document. Before printing the secure scanned document, the multi-function device 202 first decodes the content of the secure scanned document. The decoding process includes retrieving unique identity of the multi-function device 202 and further identifies the user profile of the user 103b. Based on the match, the multi-function device 202 prints the content of the secure scanned document for the user 103b. Before printing, the multi-function device 202 checks whether the user 103b is provided with print access, If yes, the multi-function device 202 proceeds forward. For example, the multi-function device 202 sends the secure scanned document to a print engine for printing. The print engine finally prints the scanned document for the user 103b.

Later, if the user 103b requests the secure scanned document to be printed in any multi-function device such as 152a (see FIG. 1B), the multi-function device 152a first checks the unique identity that is mapped to the secure scanned document. If the unique identity that is mapped to the document matches with the unique identity of the multi-function device 152a, then the multi-function device 152a decrypts the secure scanned document automatically and prints the secure scanned document. But if the unique identity that is mapped to the secure scanned document does not match with the unique identity of the multi-function device 152a, then the multi-function device 152a performs additional check. The multi-function device 152 checks the presence of the device 152a/its ID on the office network, the network where the multi-function device 102 is present or connected. Here, the multi-function device 152a performs a network search and identifies all devices connected to the network. If unique ID of the multi-function device 152a is identified in the network search, then the secure scanned document is decrypted automatically and further printed at the multi-function device 152a i.e., a different multi-function device or a networked multi-function device. In cases, the two internal checks by the multi-function device 152a result in negative identification, then the scanned document may be deleted with a display message to the user informing the user that the document does not belong to the organization and cannot be printed.

Exemplary Flowcharts

Secure Scanned Document

Figure 3:
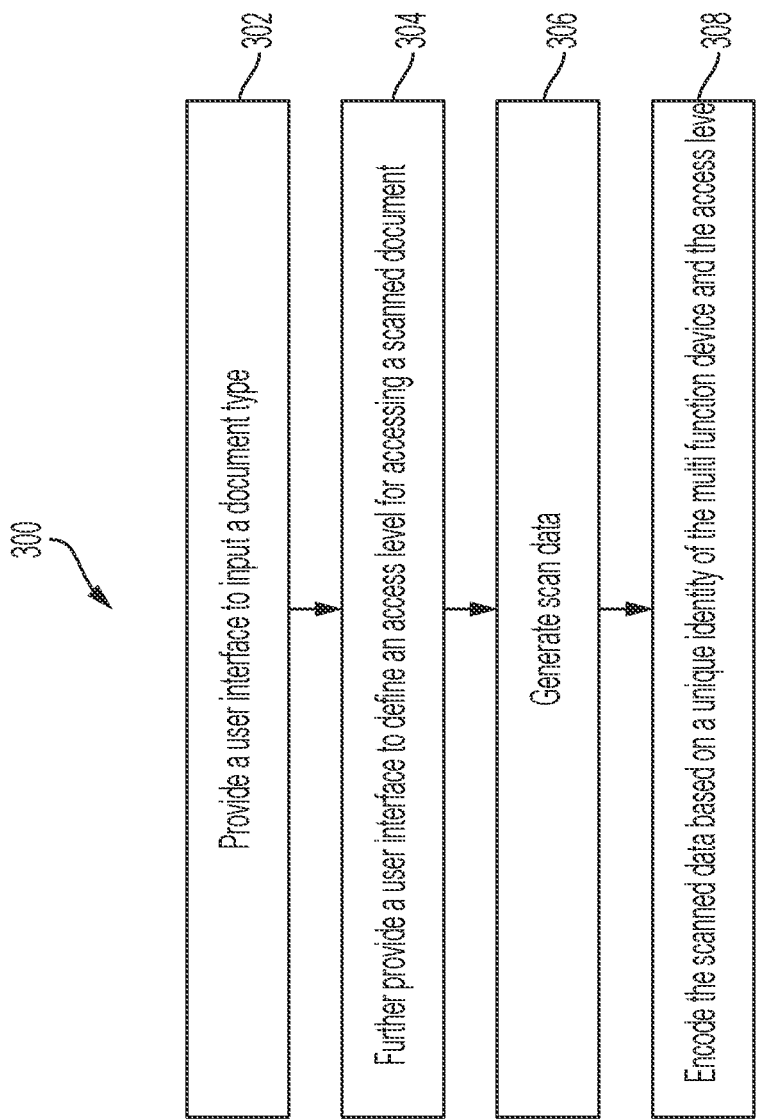
FIG. 3 is a method flowchart for providing secure scanning for a document submitted for scanning.

FIG. 3 is a method flowchart 300 for securing a document submitted for scanning. The method 300 can be implemented at a multi-function device, a scanner, or an equivalent device. The method begins with a user submitting a document for scanning at the multi-function device such as 102.

Upon receiving the document, at 302, a user interface is provided to the user to input a document type such as confidential, internal, public, external or the like. Once the document type is received, at 304, the user interface is further provided to input or define an access level for accessing the scanned document such as users who can access the scanned document and type of access such as read access or print access or both. Here, defining the access level includes defining one or more other users who can access the scanned document and further includes type of access level for the other users. For example, the user inputs details of the other users who can access the scanned document. The details of the other users can be user IDs, email addresses, employee IDs, phone numbers or the like, without limiting the scope of the disclosure. The type of access level can be read; write, or print. For example; the user can define which user to assign print access, read access and so on. Once the input from the user is received, scanning is initiated. At 306, the document is scanned to generate scanned data. At 308, the scanned data is encoded based on a unique identity of the multi-function device and an access level as defined by the user. In one example, encoding includes adding profile details of the one or more other users to the scanned data. The details may be username, user ID, employee ID, email address or the like. Encoding further includes defining access type for each of the other users. Once encoded is performed, scanned document is generated including the encoded scanned data such that the encoded scanned data can be accessed according to the access level defined by the user. This way, the secure scanned document is output at the multi-function device and the same can be accessed within the office premise by authorized users i.e., the other users who are assigned access rights by the user. Meaning the scanned document is only accessible by authorized users within office premises i.e., including office devices such as multi-function device and/or computing devices. This restricts unauthorized users to reproduce documents or unauthorized access of the scanned document. The secure scanned document can be sent to one or more destinations such as USB, email address, cloud location, network location, server location or so on.

Figure 6A:
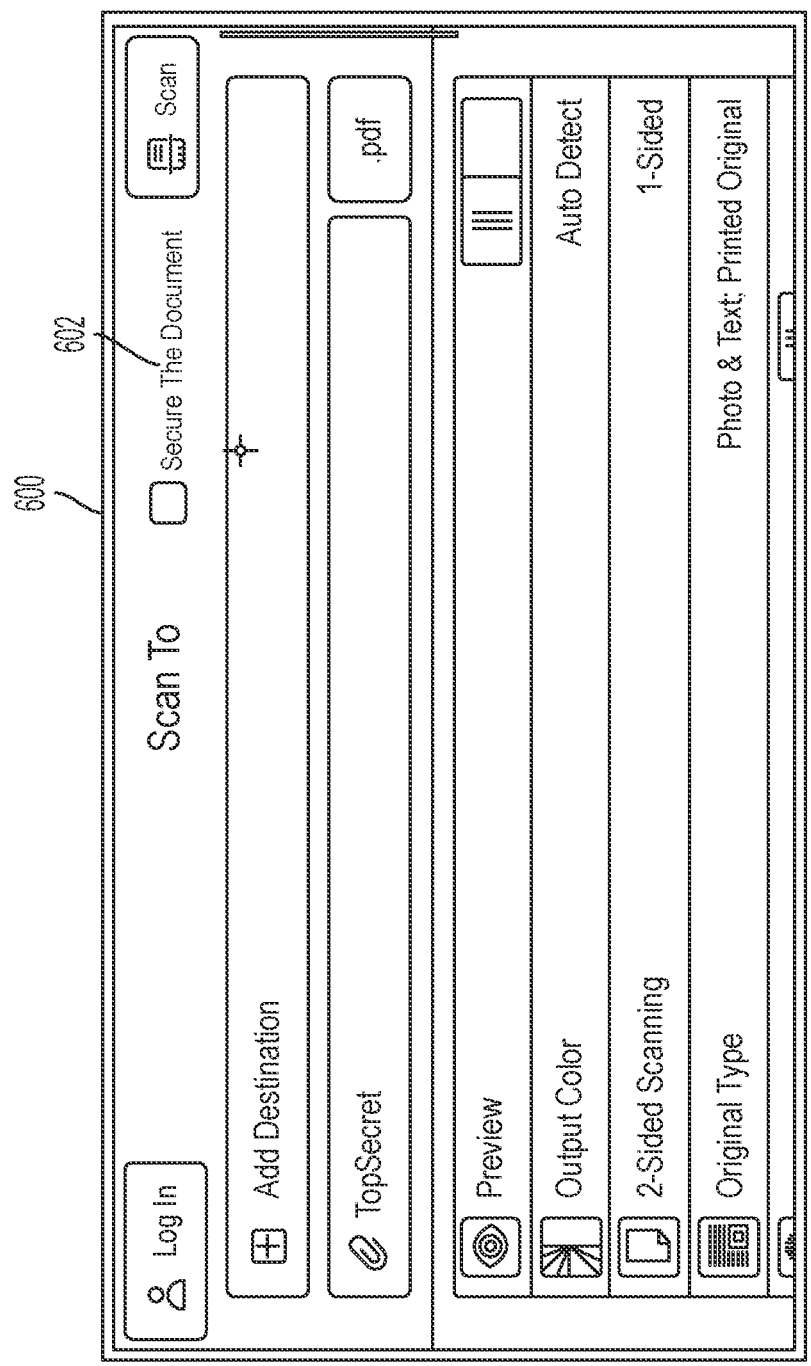
FIGS. 6A-6D show various snapshots for implementing the present disclosure.
Figure 6B:
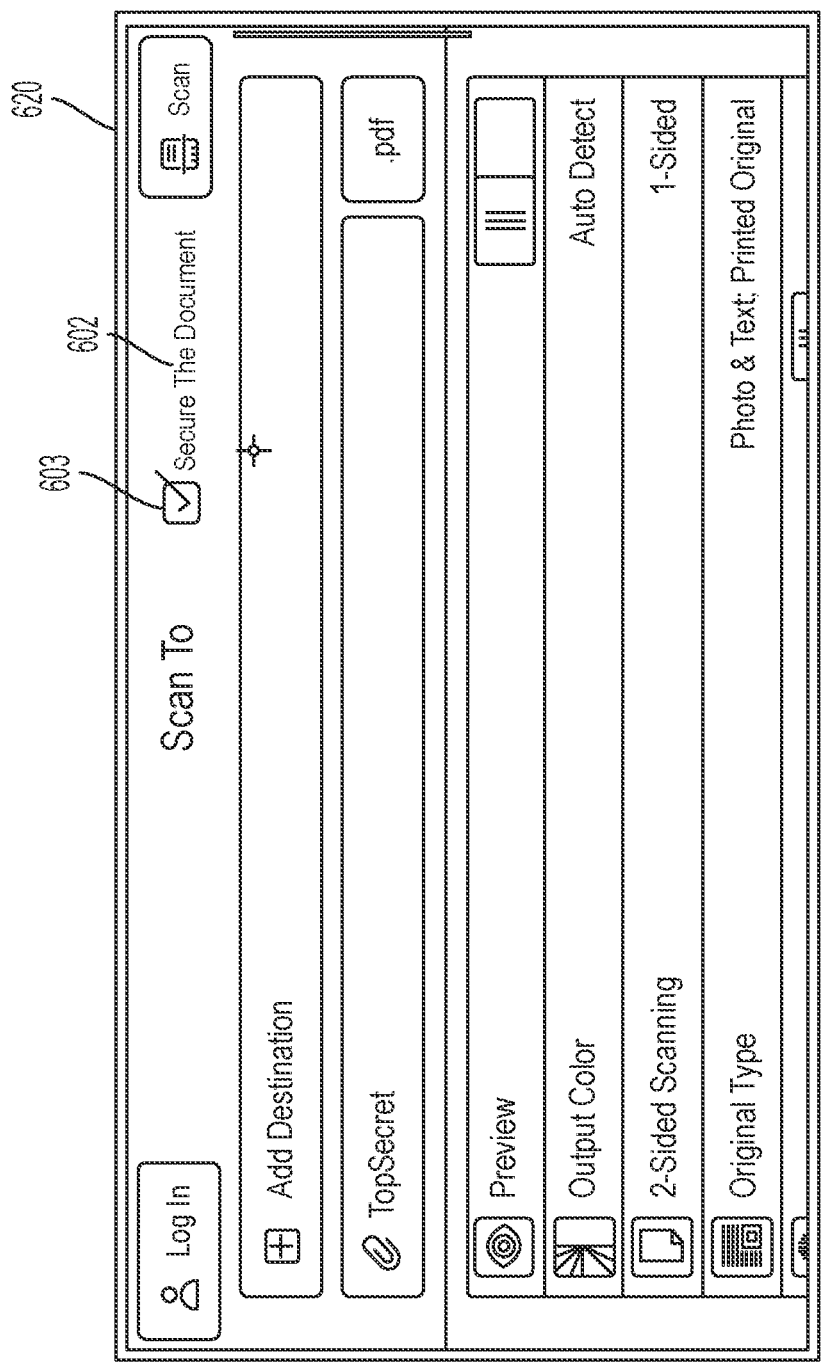
Figure 6C:
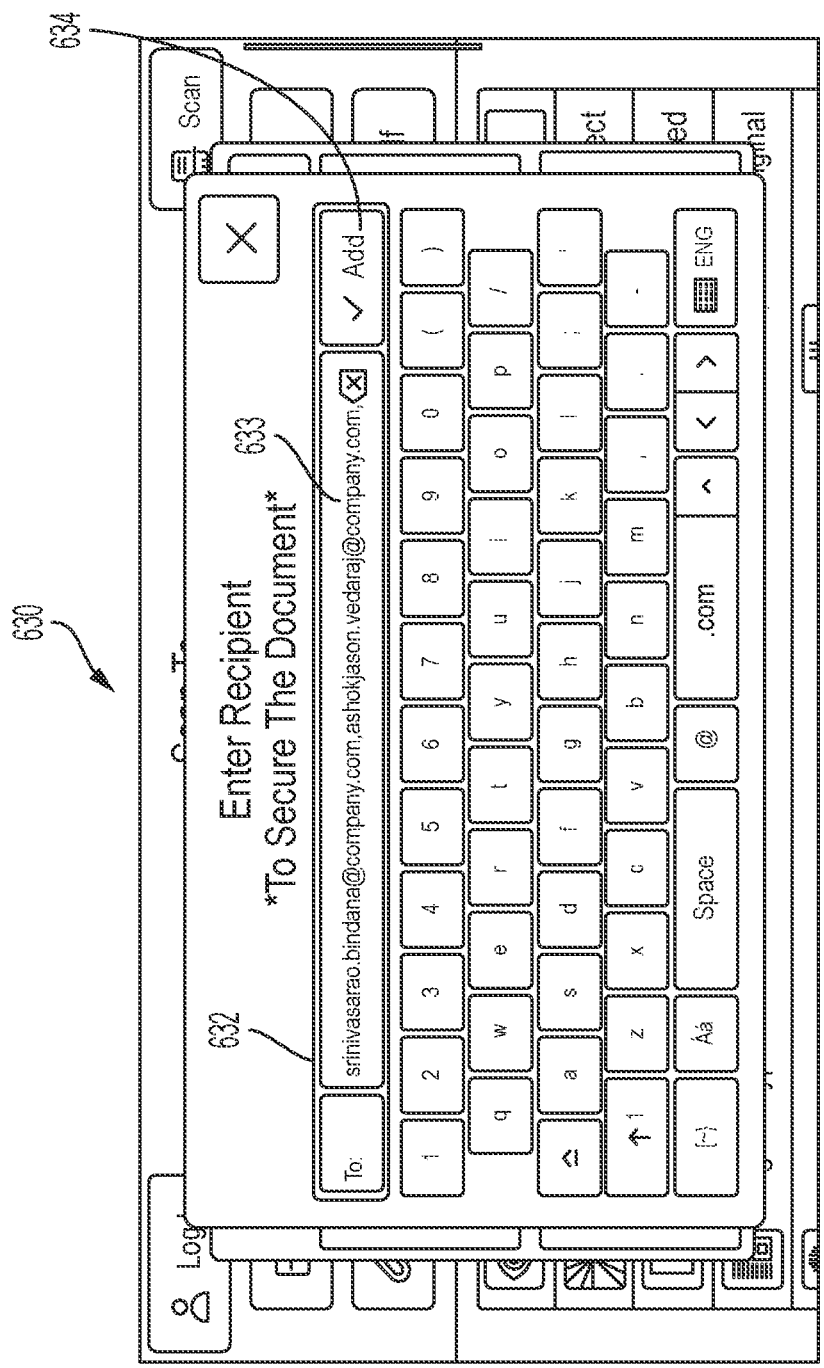
Figure 6D:
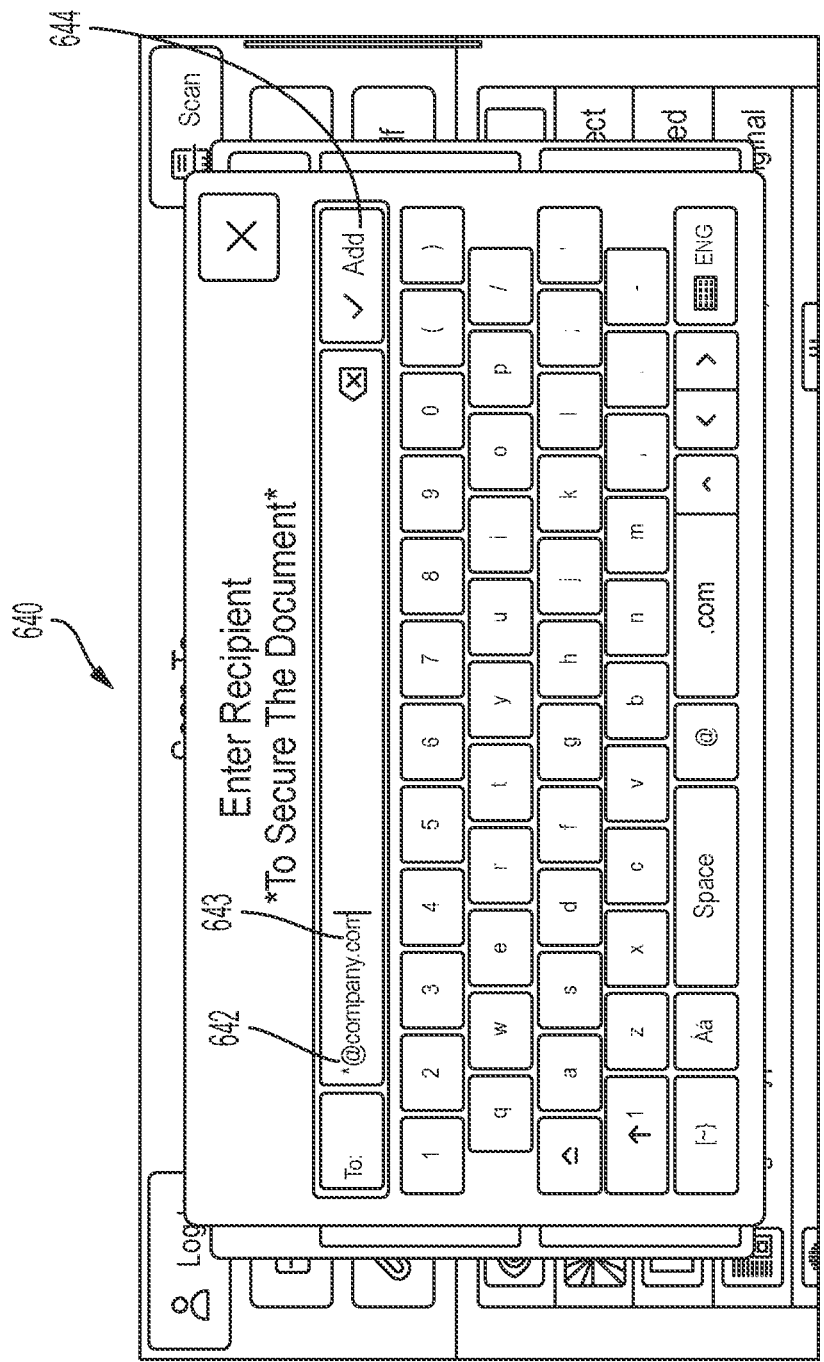

Exemplary snapshots for implementing the present disclosure are discussed here. An exemplary snapshot 600 of a user interface with scan related options is shown in FIG. 6A. The user interface includes an option 602 "Secure the document" for securing the document at the time of scanning. The option 602 can be enabled or disabled by the user as shown in FIG. 6B, As clearly seen in the snapshot 620 of FIG. 6B, the option 602 can be enabled using a checkbox 603, here the user can select the checkbox 603 for enabling the secure scanning option 602 and the user can deselect the checkbox 603 for disabling the secure scanning option 602. To secure the document at the time of scanning, the user can input required details of the other users who can access the scanned document. For example, the user can input details such as email address (marked as 633) in the given textbox 632 as shown in the snapshot 630 of FIG. 6C. The user can input any number of email addresses here and can select the option "Add" 634. The scanned document can be accessed by the users belonging to the input email addresses. If the user wants to provide access to the scanned document to more users in an organization, the user can input domain marked as 643 in the textbox 642, as shown in snapshot 640 of FIG. 6D. Once the user inputs the domain, all users belonging to the domain can access the scanned document based on the defined access type. The user can then click the option "Add" 644 as shown in FIG. 6D.

Access Scanned Document

Figure 4:
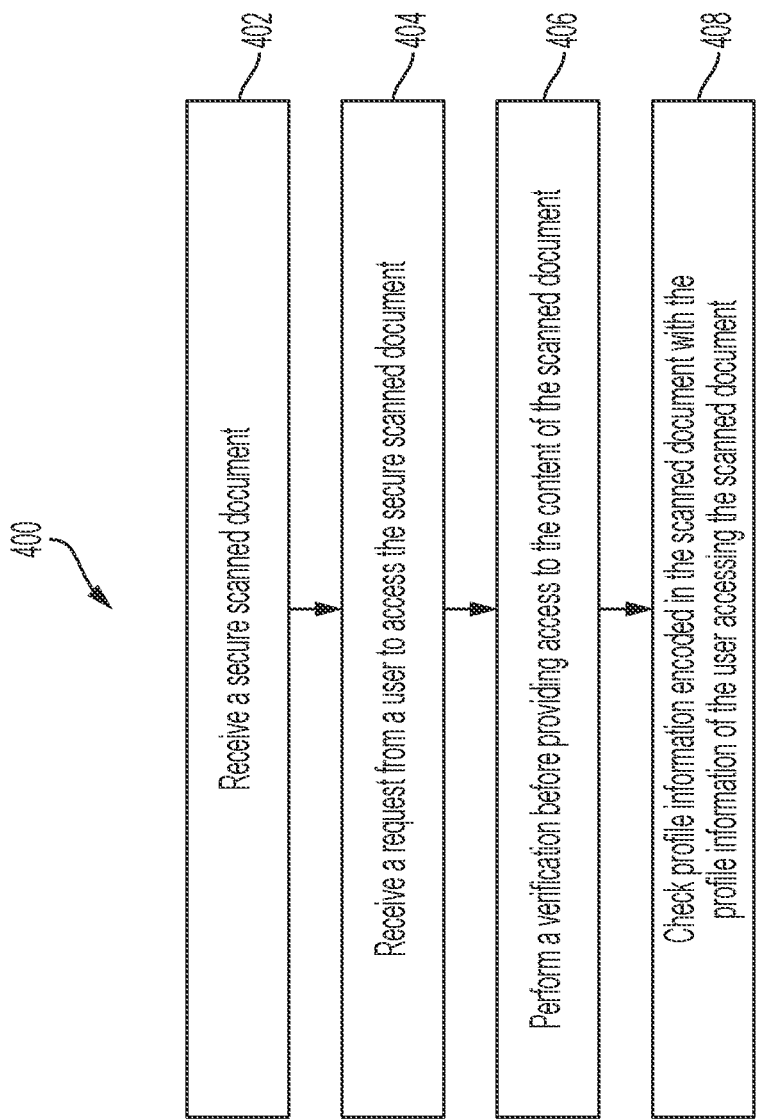
FIG. 4 is a flowchart for accessing a protected/secure scanned document.

FIG. 4 is a flowchart 400 for accessing a secure scanned document. The method 400 can be implemented at any device such as a multi-function device, a computing device, or any electronic device with communication capability.

At 402, a secure scanned document is received. The secure scanned document is the scanned document protected/secured to ensure it is accessed according to the access level as defined by a user who scans the document. The secure scanned document includes encoded scanned data, where details of users who can access the scanned document are included along with access type for each user.

At 404, a request from a user to access the secure scanned document is received at a computing device. Before providing access to the content of the scanned document, a verification is performed at 406. The verification includes decoding the scanned document. It is then checked whether the profile information encoded in the scanned document matches with the profile information of the user accessing the scanned document, at 408. The profile information of the user accessing the scanned is retrieved through the computing device. For example, in the verification process, it is checked whether the details such as email address of the user accessing the scanned document at the computing device are included in the encoded scanned document. Based on matching, the user is allowed to access the content of the scanned document. For example, if the email address of the user accessing the scanned document is found in the encoded scanned data, the user is provided access to the scanned document. It is further checked whether the user is provided read access, write access, or print access. Based on the defined access type for the user, the user is allowed to access the content of the scanned document in that mode. For example, if the user is provided read access, then the user is allowed to read or view the content of the scanned document. In another example, if the user is provided write access, then the user is allowed to modify the content of the scanned document. In further example, if the user is provided print access rights, then the user is allowed to print the content of the scanned document. In case of mismatch, the user is not allowed to access the content of the scanned document. For example, an error is shown to the user. In other example, blank page is displayed to the user. This way, the method 400 ensures that content of the scanned document is accessed only by users who match with definition of access level and within the premise of the organization. The access level includes a list of one or more users who are allowed (authorized/approved users) to access the content of the scanned and further includes a type of access level defined for each user.

Figure 5:
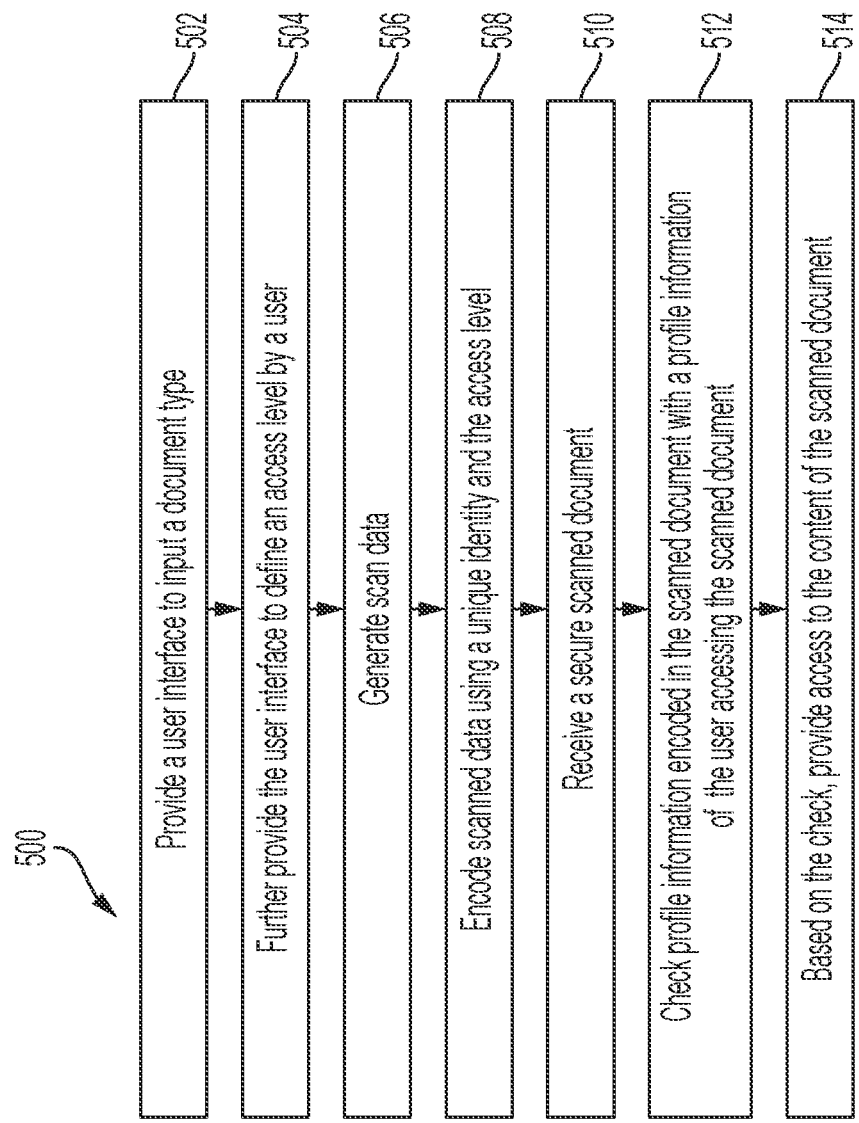
FIG. 5 is a complete method flowchart for securing a document while scanning and later accessing the secure scanned document.

FIG. 5 is a detailed method 500 for securing a document while scanning at a multi-function device and later access of the secure scanned document. The document is secured such that the scanned document can be accessed within the office premise/environment. For example, the scanned document can be accessed by authorized/approved users at a multifunction device that scans the document, or a networked multi-function device or computing devices configured according to organization policies and/or requirements. The method 500 begins with where a user submits a document for scanning at the multi-function device. The document can be a single page document or a multi-page document. The document may include any type of content such as text, image, graphics, or a combination thereof. Post submitting the document at the multi-function device, scanning process is initiated based on scan command or in put from the user. The scan input is received from the user.

At 502, a user interface is provided to the user to define a document type such as public, internal, confidential, external, or the like. The document type can be defined based on the requirement of the user and/or can be defined based on content of the document or can be defined based on organizational requirements. Based on the definition of the document type received from the user, the user further requires defining an access level for accessing the scanned document. At 504, a user interface is further provided to the user to input an access level, wherein the access level includes details of other users for providing access to the content of the scanned document and type of access level for accessing the content of the scanned document for each of the other users. For example, the access level may be defined based on the project type. In another example, the access level can be defined based on the department type. In yet further example, the access level can be defined based on the user type. These are few examples, but other variations to the access level can be defined for implementing the current disclosure. The user can select any of the desired access level.

Based on the defined access level, the user is required to provide further details of the other users through the user interlace. For example, if the access level is defined based on the project type, the user is required to input project name, names of users working on the project, email addresses of the users or other details relevant for the project type. If the access level is defined based on the department type, the user is required to input department name. If the access level is defined based on the user type, the user is required to input user details such as senior management, CEOs etc. If the access level is defined based on a distribution list (DL), the user is required to input specific DL name.

Once all the details are input by the user, corresponding relevant profiles of the users are automatically retrieved from the memory of the multi-function device. Similarly, a unique identification number of the multi-function device is retrieved from the memory. In some implementations, the user can provide inputs such as email addresses, user IDs, usernames of the other users for providing access to the content of the scanned document. This way, access level, details of the other users are received or automatically retrieved for further processing.

At 506, scanned data is generated. Before creating the scanned document, the scanned data is encoded with a unique identity of the multi-function device at 508. The unique identity may be MAC address, IP address, serial number, unique key of the multi-function device or the like. In context of the current disclosure, the scanned data is further encoded with the retrieved profile of the user who submits the request for scanning and other users profile for providing access to the scanned document. As an example, the scanned data may be encoded using the email address of the user and other users. In another example, the scanned data may be encoded using the employee ID of the user and other users. Thereafter, the encoded scanned document/file is output. The scanned output may be sent to a destination such as USB, email address, cloud location, server location, and so on. The encoded scanned document may be sent to the one or more other users. This way, the scanned document is secured by the method 500.

Later the secure scanned document can be accessed by the user and/or other users. At 510, a secure scanned document is received by a user. At 512, profile information encoded in the scanned document is checked with the profile information of the user accessing the document. At 514, based on the check, provide access to the content of the scanned document.

In scenario 1, it can be considered that the secure scanned document is accessed by the user i.e., the user who scans the document. The user accesses the scanned document using his computing device, where the computing device is a device configured according to organization requirements. Before providing access to the scanned document, a profile of the user is checked first. Specifically, details of the user are retrieved from settings of the computing device such as email address, user ID, employee ID or the like. The retrieved details, for example, employee ID is matched with the employee ID encoded with the secure scanned document. If retrieved employee ID of the user matches with the employee ID embedded/encoded with the secure scanned document, then the user is allowed to access the content of the scanned document. Finally, the content of the scanned document is displayed to the user. As a result, the scanned document is successfully accessed by the user. If the details are not matching, it indicates that the user accessing the scanned document is an unauthorized user and content of the scanned document is not decrypted for the user. In one example, the user may be shown with an error message. In another example, the user may be shown a blank document i.e., no content is displayed to the user. This way, the content of the scanned document is secured.

In further example, the user can access the scanned document at a multi-function device. Here, before displaying the scanned document to the user, a verification is performed first. The verification includes checking a unique identification number of the multi-function device and the user profile. If both matches, then content of the scanned document is decrypted and further displayed to the user. As a result, the scanned document is successfully accessed by the user. The user can view the content at the multi-function device or can print the content of the scanned document. If either of the matching fails, error is shown to the user.

In furthermore example, the user accesses the scanned document at a multi-function device outside the organization premise, i.e., his personal home multi-function device. It is first checked whether the unique ID embedded in the scanned document matches with the unique ID of the personal multi-function device. The unique ID of the personal multi-function device does not match with the unique ID embedded in the scanned document. As a result, the user is not allowed to access the content and no content is displayed to the user.

In second scenario, it can be considered that other users access the scanned document. The other users access the scanned document using their computing devices. Before providing access to the scanned document, the profile of the other users is first checked. For example, it is checked whether the email addresses of the other users match with the email addresses embedded in the scanned document. If matches, the content of the scanned document is displayed. The other users can access the scanned document.

The other users access the scanned document using a multifunction device. Before providing access to the content of the scanned document, it is first checked whether the profiles match with the profiles embedded with the scanned document. Based on the matching, content is displayed. Then, additional check is performed to identify whether the other users are given print access or not. If the other users are not given access rights for printing, the content is not printed for the other users. This way, content of the scanned document is protected.

For example, if the user email address who is accessing the scanned document matches with the user email address of the user embedded/encoded in the scanned document, the user can access the content of the document. For example, the user can view the content of the scanned document. The user can print the scanned document. Otherwise, the user is not allowed to access the content of the scanned document. The content of the user is not made displayed to the user.

The disclosure can be extended to mobile or any handheld devices of individual users. In such scenarios, images of one or more documents captured through camera of a mobile device are secured. The documents/images are encrypted with a unique ID of the mobile device that is specific to the device and profile information such as user email address, phone number or the like. This way, the document can be secured at the mobile device. Each time when the secured scanned image is accessed by the user at later time, a verification is performed to protect unauthorized access of the scanned document as discussed above in detail.

The disclosure can be implemented in the form of a non-transitory computer-readable medium. The non-transitory computer-readable medium includes instructions executable by a processing resource to: scan a document received from a user; providing a user interface to the user to define a document type and to further define an access level for the scanned document; generate scanned data; and encode the scanned data based on a unique identity of the device and based on the access level such that the scanned data is accessible by the user or by one or more other users defined according to the access level by the user.

The non-transitory computer-readable medium includes instructions executable by the processing resource to perform a verification check before allowing access to content of the scanned document.

The non-transitory computer-readable medium further instructions executable by the processing resource to allow access to content of the scanned document to the one or more other users if details of the one or more other users match with the user details added while encoding the scanned data.

The non-transitory computer-readable medium further instructions executable by the processing resource to disallow access to content of the scanned document to the one or more other users if details of the one or more users do not match with the user details added while encoding the scanned document.

The present disclosure proposes methods and systems to secure documents submitted at multi-function device for scanning. The methods and systems offer a very secure method to protect documents within the organization or outside the organization. The methods and systems provide easy approach to secure sensitive data withease using multi-function devices by default. The methods and systems are implemented to secure sensitive or confidential information and add multiple security layers with/without having any user knowledge. The methods and systems ensure all documents scanned using the multi-function device are secured always. The methods and systems are easy to implement as no user effort is required. The implementation ensures that the scanned document is secure with in the organization all the time and further reduces the data theft outside the organization. It is totally an internal process that is implemented by the multi-function device.

The methods and systems protect the scanned document using two different methods including a unique ID of the multi-function device and an access level defined by the user. The two layers of encoding protects the scanned document such that any user cannot use those protected scanned documents outside the office premise/environment/office devices/computing devices.

The methods and systems limit the ability to decrypt scanned or other electronic documents based on organizational boundaries. The methods and systems avoid accidental or intentional distribution of secure encrypted data outside of an organization. When a document is encrypted at a multifunction device, an identifier unique to the multifunction device is included. The methods and systems also have the ability to recover encrypted data if the originating multifunction device is replaced or out of service.

The document can then only be decrypted by the same multifunction device, or by a multifunction device that is on the same network as the encrypting multifunction device. An attempt to decrypt the document on a multifunction device that resides on a different network (for example, outside the originating organization) results in an error. The user may optionally provide a security code that can be provided to decrypt the document, in addition to the above.

The present disclosure proposes methods and systems for protecting documents within secure environment. The methods and systems by default secure any document getting scanned at the multi-function device and the document is secured based on users requirement. The scanned document or its content is protected such that when the document is shared outside the office premise, the scanned document cannot be printed or viewed. This way, the scanned documents are protected and kept safe within the organization and huge data loss can be avoided.

In this manner, the scanned document protected using the present methods and systems remains always secure and thus offers an enhanced level security to all scanned documents.

In all, access and use of the scanned document is restricted to the device, thereby offering an enhanced security mechanism for scanned documents including confidential data. For example, the document scanned from a mufti-function device cannot be printed in another environment as the scanned document is locked to the device.

The methods and systems propose a new way of protecting document which is scanned by a multifunction device. The scanned document is encoded such that only authorized users can access the scanned document and within the office premise.

For a person skilled in the art, it is understood that the use of phrase(s) "is", "are", "may", "can", "could", "will", "should" or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "scanning" or "printing" or "accessing" or "storing" or "encoding" or "generating" or "receiving" "or transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for securing documents submitted for scanning at a device, the method comprising:
scanning a document at the device;
providing, at the device, a user interface configured to receive input to define a document type and to further define an access level;
generating scanned data from the scanning of the document;
encrypting the scanned data based on a unique identity of the device and based on the access level defined at the user interface, wherein the encrypting comprises embedding, in the scanned data, details associated with the unique identity of the device and details associated with one or more users associated with the defined access level; and
generating encrypted scanned data from the encrypting of the scanned data; and
controlling access to the encrypted scanned data based on a comparison of the details embedded in the encrypted scanned data with an access level of a user requesting to print the document associated with the encrypted scanned data and with an identity of a device transmitting the request to print the document associated with the encrypted scanned data,
wherein if the comparison results in a match, the encrypted scanned data is decrypted to allow access to and/or printing of the document associated with the encrypted scanned data, and
wherein if the comparison fails to result in a match, access to and/or printing of the document associated with the encrypted scanned data is disallowed.

2. The method of claim 1, wherein the device is at least one of:
a multi-function device, a scanner, and a mobile device.

3. The method of claim 1, wherein the document type comprises at least one of: an internal document, an external document, a confidential document, a restricted document, a confidential and privileged document, and a public document.

4. The method of claim 1, wherein defining the access level comprises defining the one or more other users and type of access level for accessing the document associated with the encrypted scanned data.

5. The method of claim 1, further comprising, sending the encrypted scanned data to the user and/or to the one or more other users.

6. The method of claim 1, wherein a match of the identity of the device transmitting the request to print the document associated with the encrypted scanned data with the details associated with the unique identity of the device that generated the encrypted scanned data includes the device transmitting the request and the device that generated the encrypted scanned data sharing a network.

7. The method of claim 1, wherein the details of the defined access level include at least one of: an email address, a user ID, a username, an employee ID, a phone number, and a password.

8. A method for accessing a protected scanned document at a device, the method comprising:
receiving a request to access and/or print the protected scanned document, wherein the protected scanned document is encrypted with embedded details including a unique identity of a scanning device at which the encrypted scanned document was generated and one or more users associated with a defined access level;
comparing the embedded details in the protected scanned document with an access level of a user requesting to access and/or print the protected scanned document and with an identity of the device receiving the request to access and/or print the protected scanned document;
wherein if the comparing results in a match, the protected scanned document is decrypted to allow access to and/or printing of the protected scanned document; and
wherein if the comparing fails to result in a match, access to and/or printing of the protected scanned document is disallowed.

9. The method of claim 8, wherein a match of the details including the unique identity of the scanning device embedded in the protected scanned document with the identity of the device receiving the request to access and/or print the protected scanned document includes the scanning device and the device receiving the request sharing a network.

10. A multi-function device for securing documents submitted for scanning, the multi-function device comprising:
a scanner configured to scan a document;
a user interface configured to receive input to define a document type and to further define an access level for accessing the scanned document; and
a controller configured to:
generate scanned data in response to the scanner scanning a document;
encrypt the scanned data with embedded details including a unique identity of the multi-function device and one or more users associated with the defined access level; and
compare the embedded details of the encrypted scanned data with an access level of a user requesting to access and/or print the encrypted scanned data and with the unique identity of the multi-function device,
wherein the controller is further configured to decrypt and allow access to and/or printing the encrypted scanned data based on the comparison resulting in a match, and
wherein the controller is further configured to disallow access to and/or printing of the encrypted scanned data based on the comparison failing to result in a match.

11. The multi-function device of claim 10, wherein defining the access level comprises defining the one or more users and type of access level for accessing the encrypted scanned data.

12. The multi-function device of claim 10, wherein the controller is configured to send the encrypted scanned data to the one or more users.

13. A system for securing documents submitted for scanning, the system comprising:
a multi-function device configured to:
scan a document as received;
provide a user interface configured to receive input to define a document type and to further define an access level for accessing and printing the document that was scanned;
generate scanned data in response to scanning the document; encrypt the scanned data based on a unique identity of the multi-function device and based on the defined access level, wherein the encrypting comprises embedding details associated with the unique identity of the device and embedding details associated with one or more users associated with the defined access level into the scanned data; and generate an encrypted scanned document comprising the scanned data and the embedded details; and a computing device communicatively coupled to the multi-function device, the computing device configured to:

receive a request to access the encrypted scanned document;

control access to the encrypted scanned document based on a comparison of the embedded details in the encrypted scanned document with an access level of a user requesting to access and/or print the document associated with the encrypted scanned document and with an identity of a device transmitting the request to access and/or print the document associated with the encrypted scanned document;

determine if the comparison results in a match; and if the comparison results in a match, decrypt and allow access to and/or printing of the encrypted scanned document, and if the comparison does not result in a match, disallow access to and/or printing of the encrypted scanned document.

14. The system of claim 13, wherein the details of the defined access level include at least one of: an email address, a user ID, a username, an employee ID, a phone number, and a password.

* * * * *